United States Patent
Campos (10) Patent No.: US 12,508,662 B2
(45) Date of Patent: Dec. 30, 2025

(54) HOLE SAW

(71) Applicant: Jorge Campos, Goshen, IN (US)

(72) Inventor: Jorge Campos, Goshen, IN (US)

( * ) Notice: Subject to any disclaimer, the term of this patent is extended or adjusted under 35 U.S.C. 154(b) by 481 days.

(21) Appl. No.: 18/176,100

(22) Filed: Feb. 28, 2023

(65) Prior Publication Data

US 2023/0278114 A1    Sep. 7, 2023

Related U.S. Application Data (60) Provisional application No. 63/268,719, filed on Mar. 1, 2022.

(51) Int. Cl.
*B23B 51/04* (2006.01)

(52) U.S. Cl.
CPC ...... *B23B 51/0411* (2022.01); *B23B 51/0426* (2013.01); *B23B 51/0473* (2013.01)

(58) Field of Classification Search
CPC . B23B 51/04; B23B 51/0411; B23B 51/0426; B23B 51/0473; Y10T 408/8957
See application file for complete search history.

(56) References Cited

U.S. PATENT DOCUMENTS

| | | | | |
|---|---|---|---|---|
| 2,564,451 | A * | 8/1951 | Sandberg | B26F 1/14 |
| | | | | 408/206 |
| 7,938,600 | B1 * | 5/2011 | Griep | B23B 51/044 |
| | | | | 408/239 R |
| 2007/0166116 | A1 * | 7/2007 | Olson | B23B 51/0473 |
| | | | | 408/204 |

FOREIGN PATENT DOCUMENTS

| DE | 19843849 A1 * | 3/2000 | ......... B23B 51/0473 |
|---|---|---|---|
| DE | 202019103190 U1 * | 6/2019 | ............ B28D 1/041 |
| GB | 911093 A * | 11/1962 | ........... B23B 1/0473 |

* cited by examiner

*Primary Examiner* — Eric A. Gates
(74) *Attorney, Agent, or Firm* — BOTKIN & HALL, LLP; Michael D. Marston (57) ABSTRACT

A hole saw having an internal saw with a circular sidewall including a working end including teeth and a backwall connected to the sidewall. The backwall includes an aperture concentrically located with respect to the circular sidewall for receiving a pilot drill designed to extend beyond the working end of the circular sidewall. The hole saw also has an external saw with a circular sidewall with a greater diameter than the circular sidewall of the internal saw. The circular sidewall of the external saw has teeth and an oppositely located proximal end that includes tangs separated by notches. A base plate is fastened to the circular sidewall of the external saw. The base plate includes a plurality of apertures for fixing the base plate to the backwall of the internal saw and locating the circular sidewalls concentric with respect to each other.

10 Claims, 7 Drawing Sheets

HOLE SAW

CROSS REFERENCE TO RELATED APPLICATIONS

This application claims priority of U.S. Provisional application 63/268,719, filed Mar. 1, 2022, which application is hereby incorporated in its entirety by reference.

BACKGROUND

Hole saws having a cylindrically shaped saw blade extending from a base have been used for quite some time. However, the configuration of such saws has left some features to be desired. Often, hole saws have used a mandrel for holding a pilot drill as the attachment point for the base of a circular saw. Such saws have used a nut threaded on a mandrel to secure a single cylindrical saw blade. This configuration relies on the friction generated from the clamping force of the nut to prevent rotation of the saw as it cuts.

Saws having multiple cylindrical blades can be useful in certain situations. This configuration can be particularly useful when cutting multiple layers of material that are spaced from each other. In such a situation, having an internal saw surrounded by a larger diameter external saw can yield concentric holes of two different diameters in the different layers if the external saw has teeth located farther behind where the teeth of the internal saw contact the material to be cut. In a saw having this configuration, it is useful to be able to easily remove the outer saw without disturbing the connection of the inner saw to the drill. It is also useful to have a stop near the outer saw so that the depth of cut for the entire saw is limited.

SUMMARY OF THE INVENTION

A hole saw having an internal saw with a circular sidewall including a working end having teeth and an oppositely located proximal end. The internal saw has a backwall connected to the sidewall and the backwall is spaced from the working end. The backwall includes an aperture concentrically located with respect to the circular sidewall. The aperture is for receiving a pilot drill extending beyond the working end of the circular sidewall.

The hole saw also has an external saw with a circular sidewall having a greater diameter than the circular sidewall of the internal saw. The circular sidewall of the external saw includes a working end with teeth and an oppositely located proximal end having a plurality of tangs separated by notches and a base plate having an inner diameter and an outer diameter having a plurality of arcuate slots located between the inner diameter and the outer diameter of the base plate receiving tangs into the arcuate slots in the base plate. The outer diameter annular base plate is larger than the diameter of the circular sidewall of the external saw. The base plate includes a plurality of apertures located between the inner and the outer diameters of the annular base plate. Each aperture of the base plate receives a fastener for affixing the base plate to the backwall of the internal saw and locating the circular sidewall of the external saw concentric with respect to the circular sidewall of said internal saw.

DETAILED DESCRIPTION OF THE INVENTION

Figure 1:
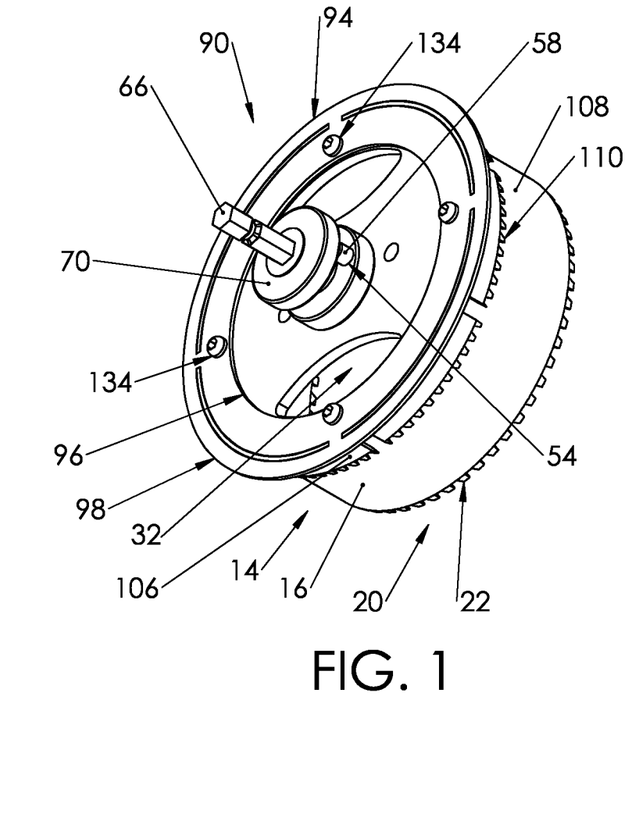
FIG. 1 is an isometric view of the hole saw as it is fully assembled showing the backwall.
Figure 2:
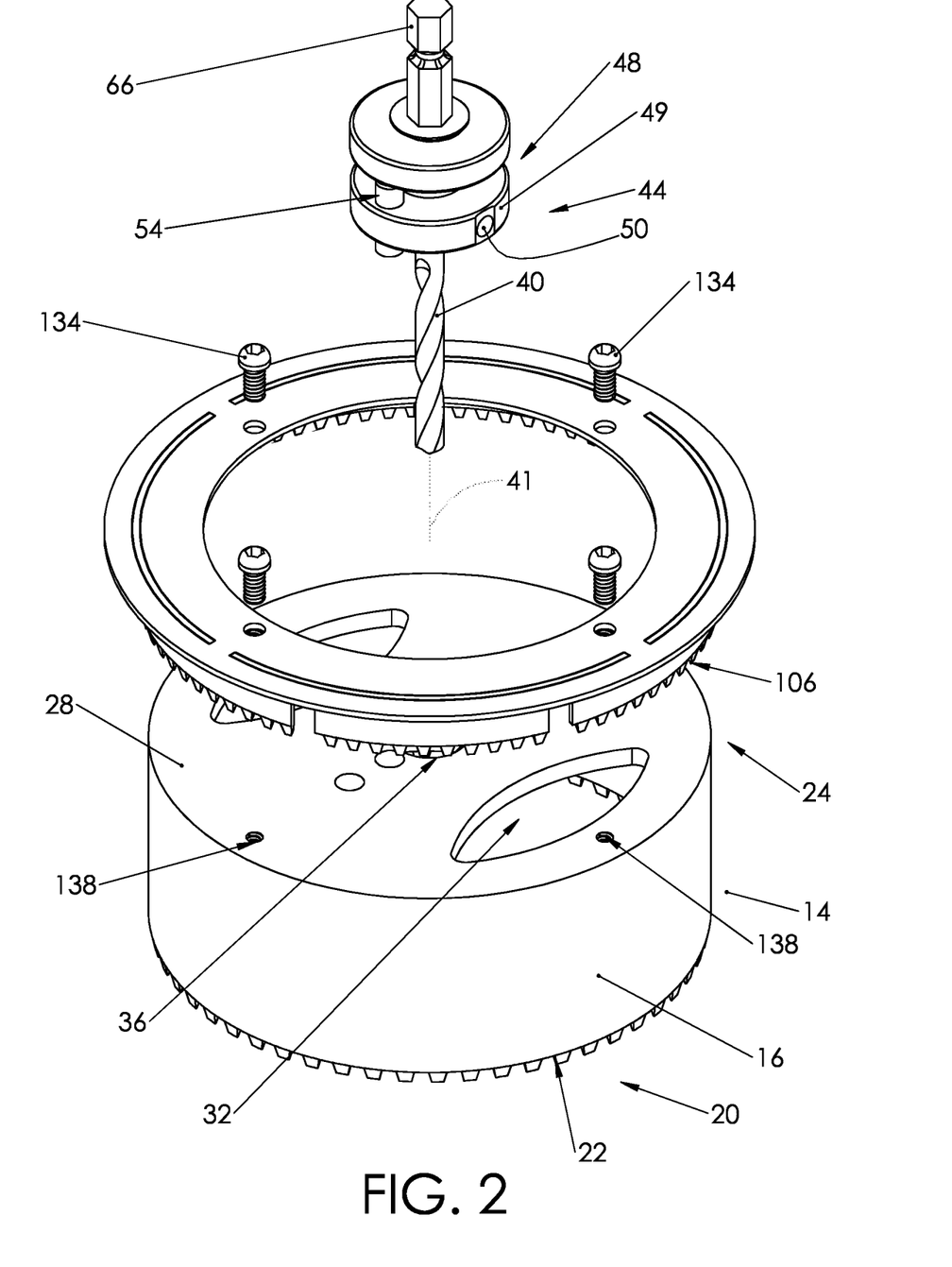
FIG. 2 is an exploded isometric view of the hole saw shown in FIG. 1.
Figure 3:
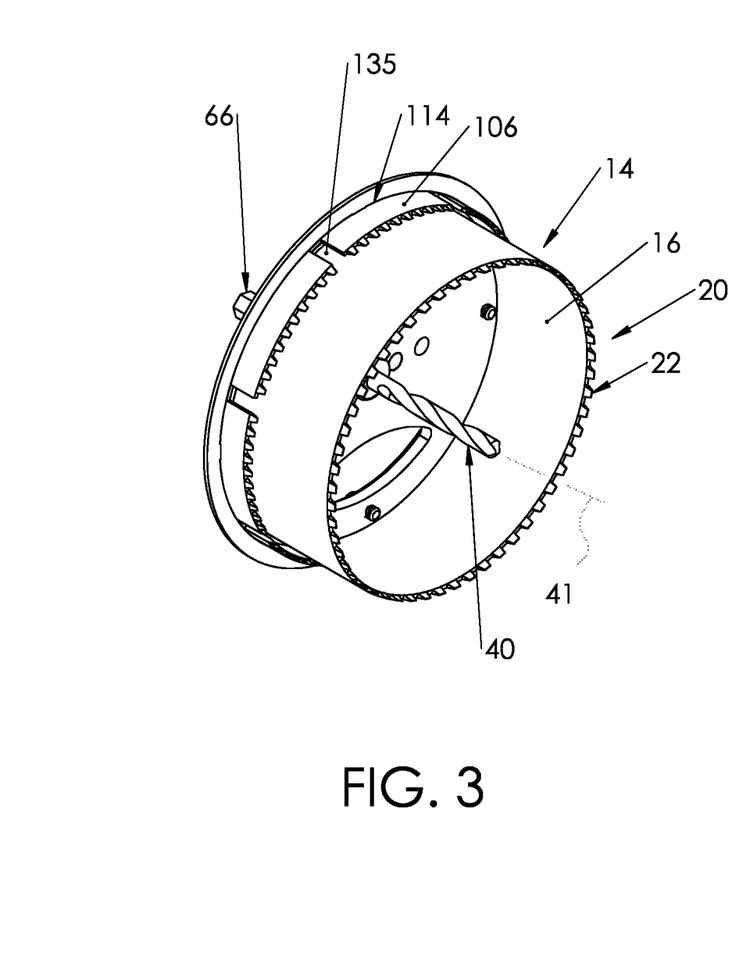
FIG. 3 is an isometric view of the hole saw shown in FIGS. 1 and 2 showing the working end of the saw.
Figure 4:
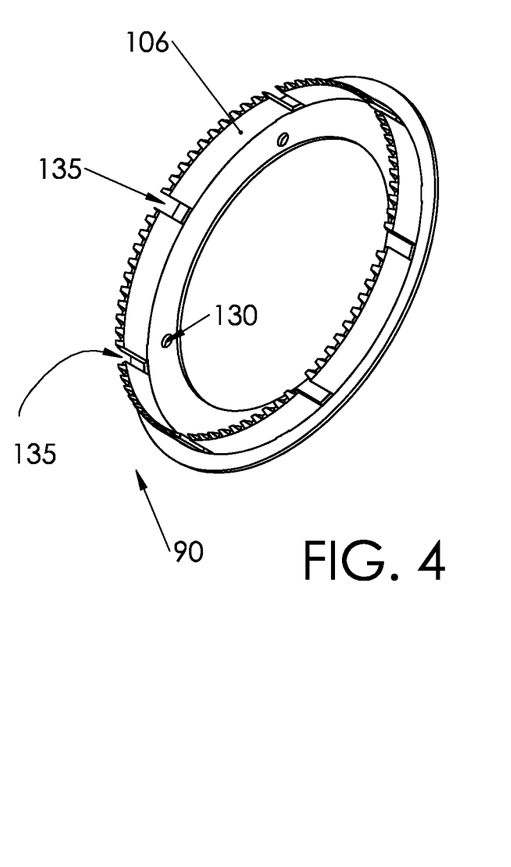
FIG. 4 is an isometric view of the outer saw.
Figure 5:
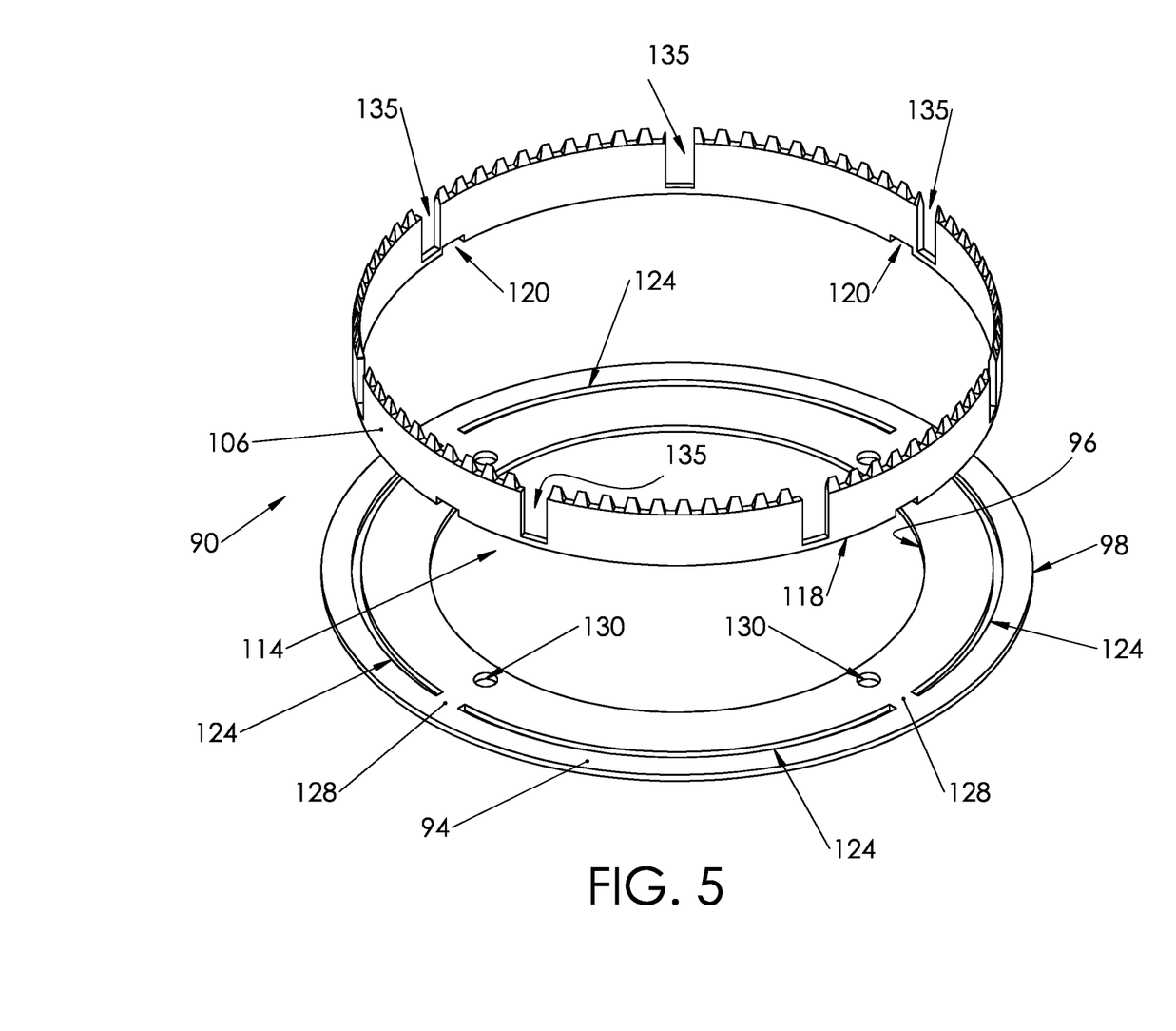
FIG. 5 is an exploded view of the outer saw shown in FIG. 4.
Figure 6:
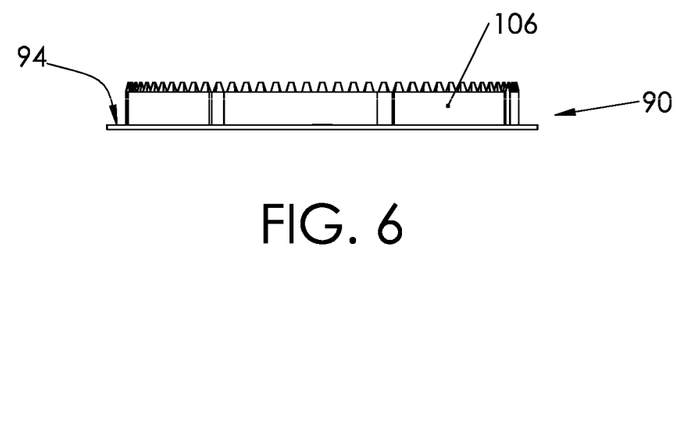
FIG. 6 is a side view of the outer saw shown in FIGS. 4 and 5.
Figure 7:
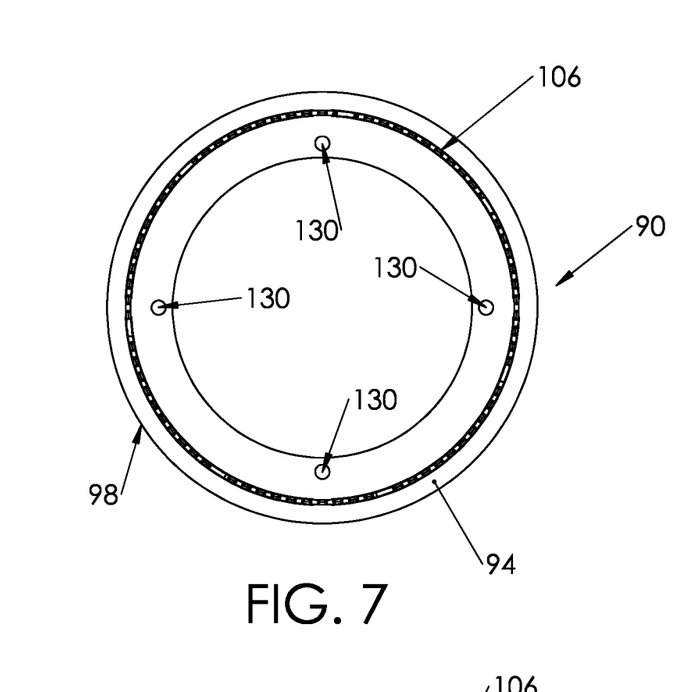
FIG. 7 is a view of the outer saw shown in FIGS. 4-6 showing the working end.
Figure 8:
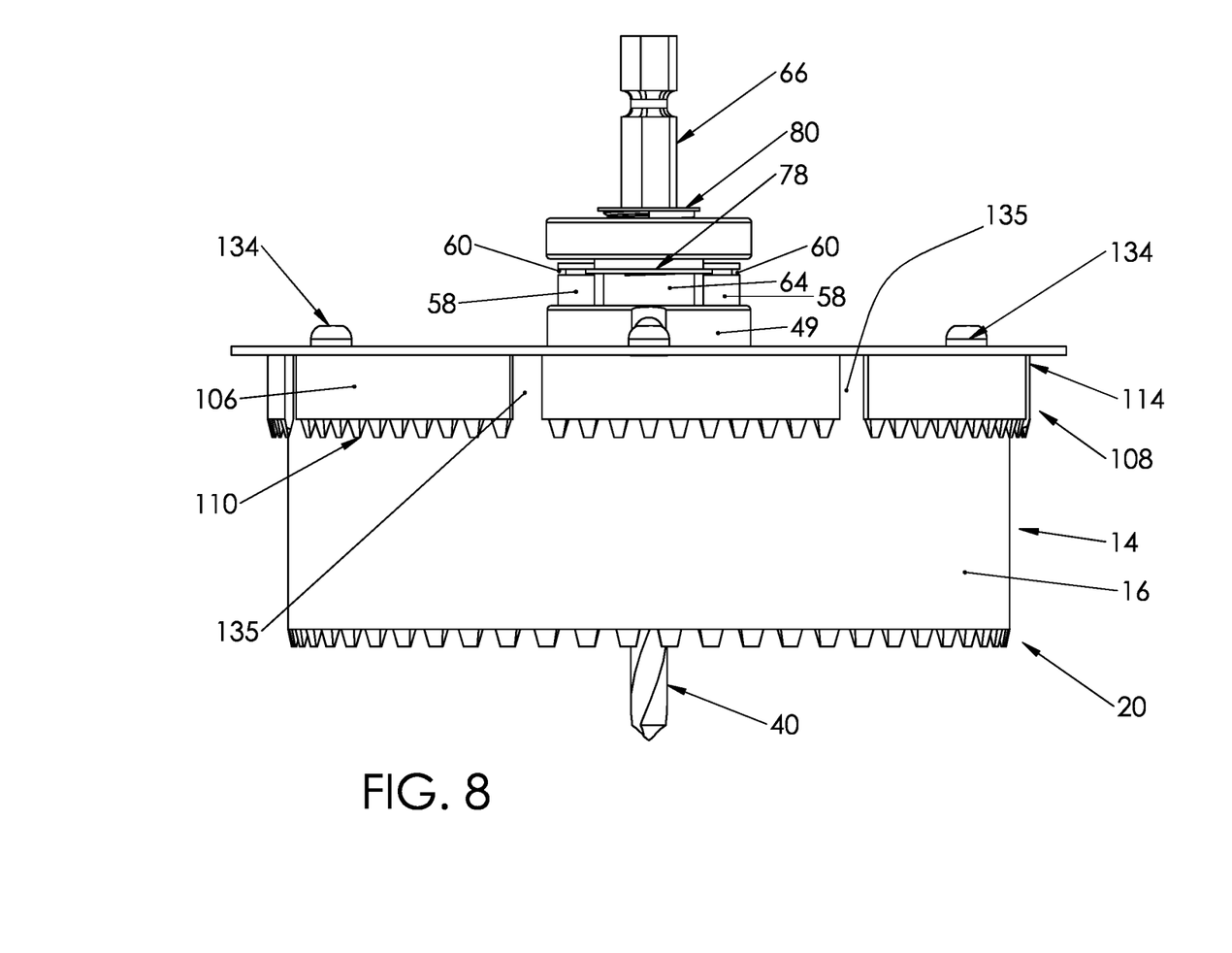
FIG. 8 is a side view of the hole saw shown in FIGS. 1-3.
Figure 9:
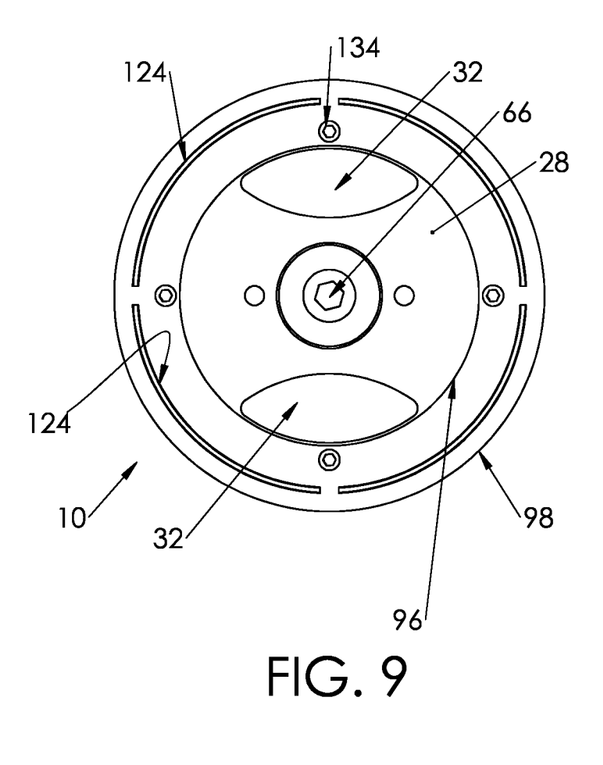
FIG. 9 is a view of the hole saw shown in FIG. 8 showing the back wall.
Figure 10:
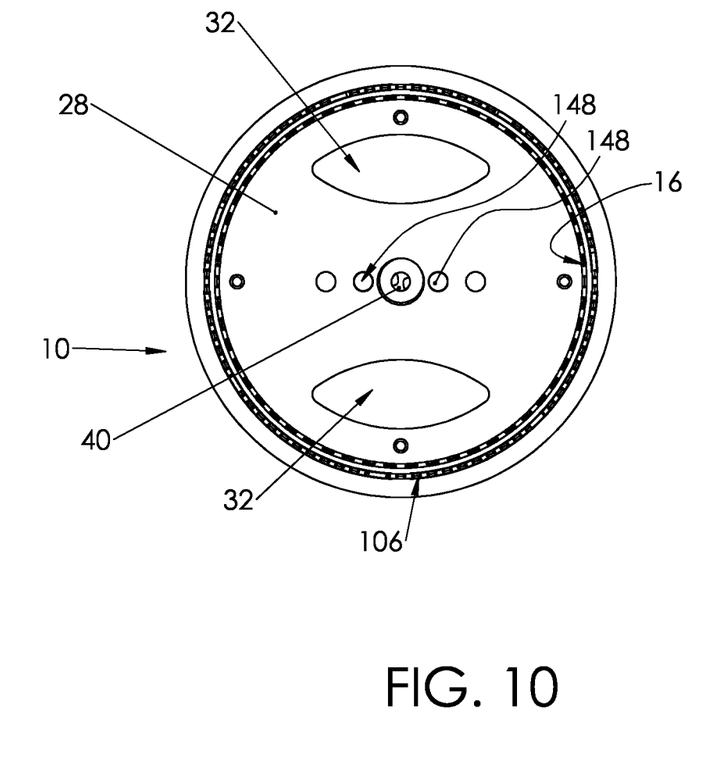
FIG. 10 is a view of the hole saw shown in FIGS. 8 and 9 showing the working end of the hole saw.
Figure 11:
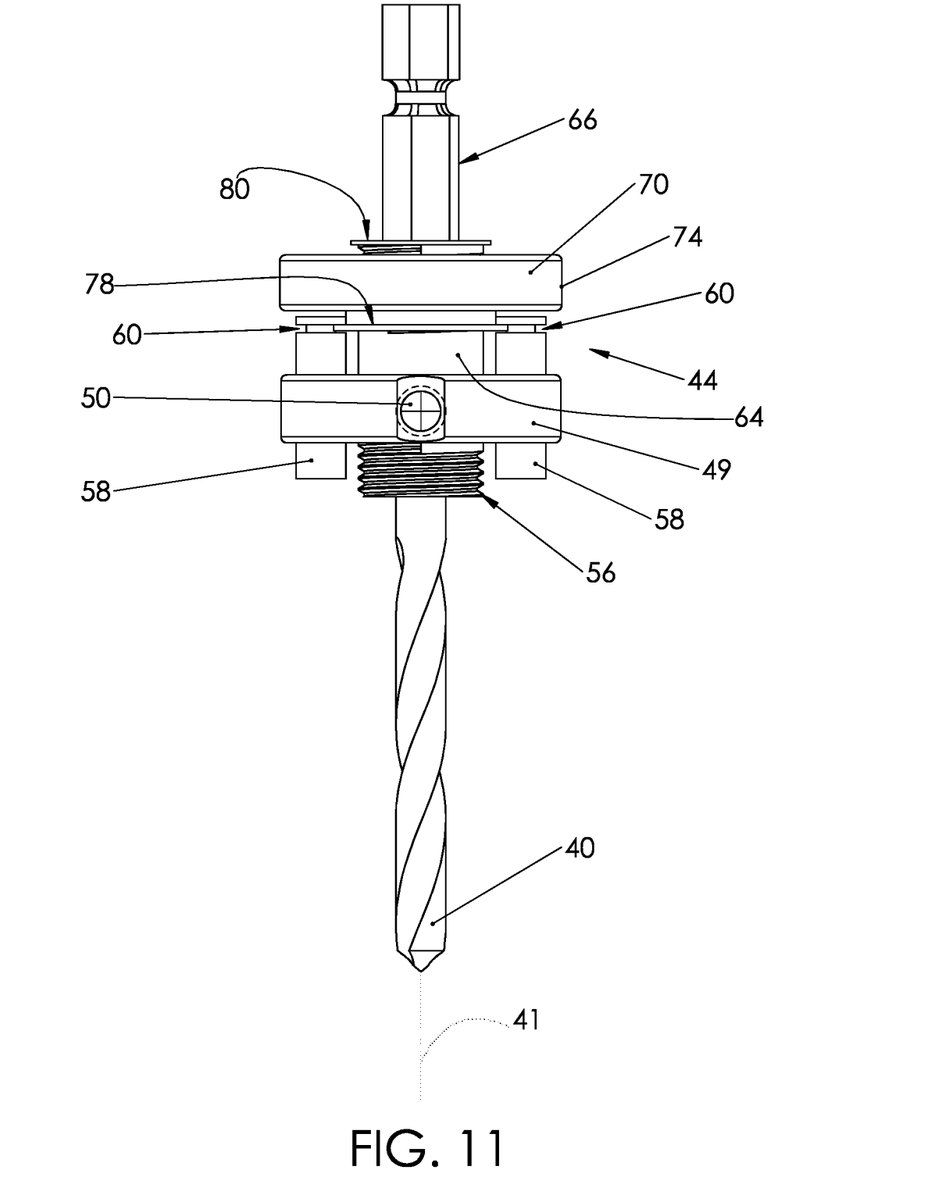
FIG. 11 is a side view showing the pilot drill assembly.

The hole saw 10 of the present invention has an internal saw 14 that has a circular sidewall 16 that has a working end 20 with teeth 22 and an oppositely located proximal end 24. The proximal end 24 has a backwall 28 that spans across the internal saw 14. In the internal saw 14 shown in FIGS. 1 and 2, the backwall 28 is integrally joined to the sidewall 16. It is contemplated that the backwall 28 may not be integral with sidewall 16, but may also be a separate part attached to the sidewall 16. The backwall 28 includes ejection holes 32 in which an instrument may be inserted to dislodge any remnants of material cut with the internal saw 14. The backwall 28 also includes a drill hole 36 that is centrally located within the backwall 28 concentric with the circular sidewall 16. The drill hole 36 is for receiving a pilot drill 40 held within a pilot drill assembly 44. The pilot drill 40 has an axis 41 that defines an axial direction of the hole saw 10 and axis 41 is the center of circular sidewall 16. The pilot drill assembly 44 includes a collet 48 having a locking flange 49 with a set screw 50 that tightens down on the pilot drill 40 to hold the pilot drill 40 within the pilot drill assembly 44. The collet 48 has a threaded arbor 56 extending from the locking flange 49 with threads that mate with threads in the drill hole 36 located in the backwall 28. The collet 48 has two axial holes 54 within the locking flange 49 for receiving locking pins 58 that may move within the axial holes 54 in an axial direction that is substantially parallel to the axis 41 of the pilot drill 40. Each locking pin 58 has a circumferential notch 60. The collet 48 also includes an upper threaded shaft 64 that is coaxial with the threaded arbor 56 and the upper threaded shaft 64 extends away from the locking flange 49 in an opposite direction to the threaded arbor 56. The upper threaded shaft 64 continues into a shank 66 that is for being received in a drill chuck. A locking nut 70 is threaded onto the upper threaded shaft 64 and is movable thereon in an axial direction as the locking nut 70 as it is rotated upon the upper threaded shaft 64. The locking nut 70 has a major flange 74 including knurling on its outer diameter. The locking nut 70 also has a retention flange 78 that is received in the notches 60 in the locking pins 58. As the locking nut 70 moves axially along the shaft 64, the pins 58 are moved axially within the axial holes 54 because the retention flange 78 is held within the notches 60 in each locking pin 58. The locking nut 70 can be turned until it reaches a stop 80 on the upper threaded shaft 64 that is spaced from the locking flange 49. The stop 80 is a snap ring that limits its travel away from the major flange 74. The locking nut 70 may be tightened until the retention flange 78 contacts the locking flange 49. When the locking nut 70 contacts the stop 80, this corresponds to a retracted position because it corresponds to a position in which the locking pins 58 are retracted into the locking flange 49. When the locking nut contacts the locking flange 49, this corresponds to a locked position because it corresponds to a position in which the locking pins 58 are fully extended from the locking flange 49.

The hole saw 10 includes an external saw 90 that circumscribes the internal saw 14. The external saw 90 has a base plate 94 having an inner diameter 96 and an outer diameter 98. The inner diameter 96 and outer diameter 98 define the annular width of base plate 94. The external saw 90 has a circular sidewall 106 having a working end 108 with teeth 110 and an oppositely located proximal end 114 having tangs 118 separated by notches 120. The base plate 94 has multiple arcuate slots 124 that are separated by bridges 128 of material spanning between the arcuate slots 124. The tangs 118 of the sidewall 106 fit within the arcuate slots 124 in the base plate 94, and bridges 128 of the base plate 94 fit within the notches 120. The proximal end 114 of sidewall 106 fits into the base plate 94 in a complementary manner so that both the base plate 94 and sidewall 106 interlock. Once that interlocking connection is made between the base plate 94 and the sidewall 106, the two are welded together. The external saw 90 includes fastener apertures 130 through the base plate 94. The fastener apertures 130 are for receiving screws 134 that are driven into holes 138 in the backwall 28 of the internal saw 14. The screws 134 could be rivets or other fasteners, but the use of screws 134 creates an external saw 90 that is readily removable from the internal saw 14. The screws 134 are easily accessible and driven in the axial direction of the saw 10 with the screws 134 being substantially parallel to the axis 41 of the pilot drill 40. When the screws 134 are driven into the backwall 28 of internal saw 14, the circular sidewall 106 is concentric with the pilot drill 40 and the circular sidewall 16 of the internal saw 14. The screws 134 provide an axial clamping force between the base plate 94 and the backwall 28, yet provide for selective removal of the external saw 90 from the internal saw 14 when desired. There is no attachment of the external saw 90 inside of the inner diameter 96 of the base plate 94 and the screws 134 provide the sole clamping force to affix the external saw 90 to the backwall 28. The screws 134 provide a more stable connection of the external saw 90 to the inner saw 14 than the prior art. Many prior art saws rely on a centrally mandrel having clamping from a nut opposing another surface to provide friction to resist rotation of the saw, but in the present invention the screws 134 would have to be sheared between the base plate 94 and backwall 28 before the saws 14, 90 could spin relative to each other. The inner diameter 96 is spaced from the pilot drill assembly 44 and thus, the external saw 90 can be removed independently of the pilot drill assembly 44. The configuration of the base plate 94 overlying the backwall 28 allows for removal of the external saw 90 in a direction opposite the teeth 22 of the internal saw 14. As such, removal of the external saw 90 can be done without effecting the internal saw 14. In this manner, it is possible to use the internal saw 14 by only removing the external saw 90 if such a configuration is desired. Additionally, the pilot drill assembly 44 can be removed without removing or effecting the external saw 90. This allows changing of the pilot drill 40 or the entire pilot drill assembly 44 without effecting the relationship of the external saw 90 with respect to the internal saw.

The relationship of the features of the hole saw 10 make it particularly useful in cases where other saws would not be useful. The pilot drill 40 extends at least slightly beyond the teeth 22 of the internal saw 14. This allows the pilot drill 40 to engage material to be cut first so that the hole saw 10 does not walk on the surface of the material to be cut. As the internal saw 14 plunges into the material, the entire hole saw 10 may continue toward the material to be cut. The hole saw 10 is particularly useful when cutting materials that are spaced from each other by a separation distance. In the case of cutting into a wall including ductwork, the material to be cut may be two layers of material. The first layer of material may a wall material and the second layer of material may be one sidewall of a duct contained within the wall. In this case, the first layer is contacted with the pilot drill 40 to locate the center of the hole to be cut. Then, the teeth 22 of the internal saw 14 cut through the first layer of material and also continue into the second layer of material. At this point of the cutting operation, the sidewall 16 of the internal saw slides through the hole it just cut until the teeth 110 of the external saw 90 engage the first layer of material at a diameter larger than the diameter of the internal saw 14. The external saw 90 cuts the first layer to form a hole concentric with the hole that the internal saw 14 cut in the second layer of material. When the external saw 90 cuts through the first layer of material, the base plate 94 bottoms out on the first layer of material on the portion of the base plate 94 extending beyond the diameter of the external saw 90 defined by sidewall 106. This portion of the base plate 94 radially outside the sidewall 106 acts as a stop that prevents movement of the saw any further into the wall, and therefor prevents cutting the opposite wall of the duct beyond the second layer of material, which corresponds to the wall of the duct adjacent to the wall being cut. This results in perfectly concentric holes in the first and second layer that are spaced apart and the holes may be used for the installation of a vent that mates with both holes.

When a user is done cutting material, he may use notches 135 in the sidewall 106 of the external saw for insertion of a tool such as a screwdriver or other prying device to remove material between the sidewall 106 of the external saw 90 and the sidewall 16 of the internal saw 14. If the user needs to change the drill 40, he may rotate the locking nut 70 in a loosening direction to move it along the threaded shaft 64 away from the locking flange 49 so the locking pins 58 are moved into their retracted positions that corresponds to them being retracted into the locking flange 49. This withdraws the locking pins 58 from locking holes 148 that are in the backwall 28 adjacent to the drill hole 36. When the locking pins 58 are in their retracted position the entire collet 48 holding the drill 40 may be unscrewed from the drill hole 36. A user may then loosen the set screw 50 to change the drill 40. Then the pilot drill assembly 44 may be reinstalled by threading the threaded arbor 56 into the drill hole 36 so the locking pins 58 align with the locking holes 148 in the backwall 28 and then rotating the locking nut 70 so the locking pins 58 are moved to their locked position with the lock nut 70 contacting the locking flange 49 so that the locking pins 58 extend into the locking holes.

The invention is not limited to the details given above but may be modified within the scope of the following claims.

What is claimed is:

1. A hole saw comprising:
an internal saw having a circular sidewall including a working end having teeth and an oppositely located proximal end, a backwall connected to said sidewall and spaced from said working end, said backwall including an aperture concentrically located with respect to said circular sidewall, said aperture for receiving a pilot drill extending beyond said working end of said circular sidewall; and an external saw having a circular sidewall having a greater diameter than said circular sidewall of said internal saw, said circular sidewall of said external saw including a working end having teeth and an oppositely located proximal end having a plurality of tangs being separated by notches, a base plate having an inner diameter and an outer diameter and having a plurality of arcuate slots located between said inner diameter and said outer diameter of said base plate, said tangs extending into said arcuate slots in said base plate and said circular sidewall of said external saw being affixed to said base plate, said inner diameter of said base plate being spaced from said aperture in said backwall of said internal saw and said outer diameter of said annular base plate being larger than said diameter of said circular sidewall of said external saw, said base plate including a plurality of apertures located between said inner and said outer diameters of said annular base plate, each aperture of said base plate receiving a fastener for affixing said base plate to said backwall of said internal saw on a rearward surface of said backwall being located opposite to said working end of said sidewall of said internal saw and said fasteners affixing said base plate to said backwall of said internal saw on said rearward surface and locating said circular sidewall of said external saw concentric with respect to said circular sidewall of said internal saw;

a pilot drill assembly having a locking flange including axial holes and having a threaded arbor extending from said locking flange, said axial holes in said locking flange containing locking pins movably engaged therein, said locking pins including a circumferential notch, said locking flange having an upper threaded shaft opposite said threaded arbor, a locking nut engaged on said threaded shaft and said locking nut including a retention flange, said retention flange engaging said circumferential notch on said locking pins, rotation of said locking nut about said threaded arbor causing axial movement of said threaded nut and said locking pins, said locking pins for engaging locking holes in backwall of said internal saw.

2. The hole saw of claim 1, wherein said fasteners are screws and said backwall of said internal saw includes threaded holes for receiving said screws.

3. The hole saw of claim 2, wherein said tangs are welded into said base plate.

4. The hole saw of claim 3, wherein said circular sidewall of said external saw includes second notches extending from said working end to a lower surface of said base plate.

5. A hole saw comprising:

an internal saw having a circular sidewall including a working end having teeth and an oppositely located proximal end, a backwall connected to said sidewall and spaced from said working end, said backwall of said internal saw having a rearward surface oppositely located with respect to said working end having said teeth, said backwall including an aperture concentrically located with respect to said circular sidewall, said aperture for receiving a pilot drill extending beyond said working end of said circular sidewall of said internal saw; and an external saw having a circular sidewall having a greater diameter than said circular sidewall of said internal saw, said circular sidewall of said external saw including a working end having teeth and an oppositely located proximal end, a base plate having an inner diameter and an outer diameter, said circular sidewall of said external saw being affixed to said base plate, said inner diameter of said base plate being spaced from said aperture in said backwall of said internal saw said base plate including a plurality of apertures located between said inner and said outer diameters of said annular base plate, each aperture of said base plate receiving a fastener for affixing said base plate to said rearward surface of backwall of said internal saw and locating said circular sidewall of said external saw concentric with respect to said circular sidewall of said internal saw.

6. The holes saw of claim 5, wherein said circular sidewall of said external saw includes a plurality of tangs on said proximal end, said tangs being separated by notches, and said base plate having a plurality of arcuate slots located between said inner diameter and said outer diameter of said base plate, said tangs extending into said arcuate slots.

7. The hole saw of claim 6, wherein said tangs are welded into said base plate.

8. The hole saw of claim 5, wherein said fasteners are screws and said backwall of an inner saw includes threaded holes for receiving said screws.

9. The hole saw of claim 5, wherein said pilot drill is contained within a removable pilot drill assembly, said pilot drill assembly being removable when said base plate is affixed to said backwall of said internal saw.

10. A hole saw comprising: an internal saw having a circular sidewall including a working end having teeth and an oppositely located proximal end, a backwall connected to said sidewall and spaced from said working end, said backwall of said internal saw having a rearward surface oppositely located with respect to said working end having said teeth, said backwall including an aperture concentrically located with respect to said circular sidewall, said aperture for receiving a pilot drill extending beyond said working end of said circular sidewall of said internal saw; and an external saw having a circular sidewall having a greater diameter than said circular sidewall of said internal saw, said circular sidewall of said external saw including a working end having teeth and an oppositely located proximal end, a base plate having an inner diameter and an outer diameter, said circular sidewall of said external saw being affixed to said base plate, an inner diameter of said base plate being spaced from said aperture in said backwall of said internal saw, said base plate including a plurality of apertures located between said inner and said outer diameters of said annular base plate, each aperture of said base plate receiving a fastener for affixing said base plate to said rearward surface of said backwall of said internal saw and locating said circular sidewall of said external saw concentric with respect to said circular sidewall of said internal saw.

* * * * *